March 4, 1924.
M. M. MEIGHEN
FISH BAIT
Filed May 11, 1922
1,486,028
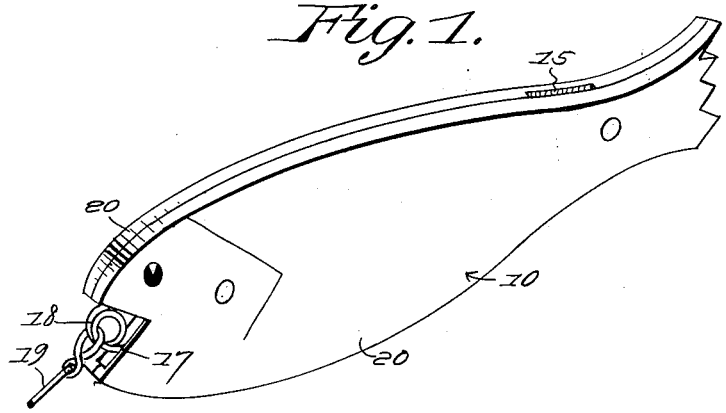
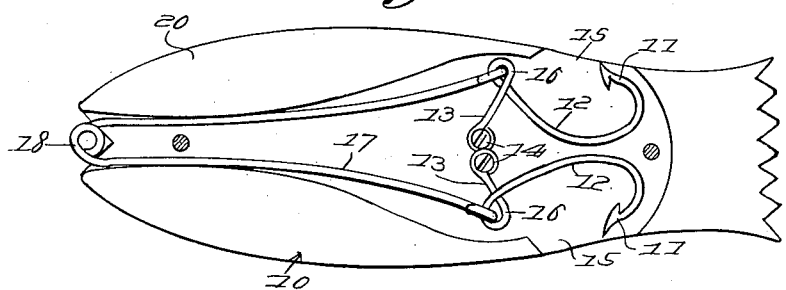
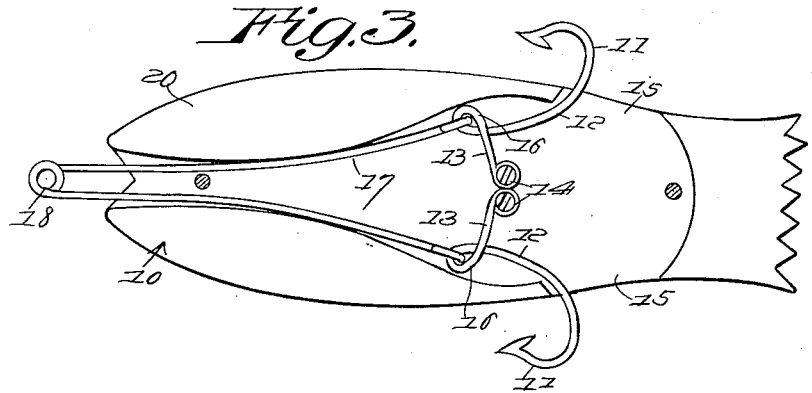
Inventor
M. M. Meighen,
By
Attorney Patented Mar. 4, 1924.

1,486,028

UNITED STATES PATENT OFFICE.

MURRY M. MEIGHEN, OF MARION, INDIANA.

FISH BAIT.

Application filed May 11, 1922. Serial No. 560,081.

*To all whom it may concern:*

Be it known that MURRY M. MEIGHEN, a citizen of the United States, residing at Marion, in the county of Grant and State of Indiana, has invented new and useful Improvements in Fish Bait, of which the following is a specification.

The object of the invention is to provide a fishing or trolling bait having invisible or receding hooks which are adapted for extension into operative position when a strain is applied to the line; and with these objects in view the invention consists in a construction and combination of parts of which a preferred embodiment is shown in the accompanying drawings, wherein:—

Figure 1 is a view of a bait embodying the invention.

Figure 2 is a longitudinal sectional view of the same showing the hooks in the housed or normal position.

Figure 3 is a similar view showing the hooks in the extended or operative position.

The bait body 10 is preferably in the form of a small fish or minnow although adapted to be made in any preferred form to attract the fish to be baited, said body forming a housing or casing for hooks 11 provided with stems 12 having offset or lateral arms 13 pivotally mounted upon the casing or housing at 14 for swinging movement to cause the projection of the barbed ends of the hooks from their normal housed position indicated in Figure 2 through slots 15 in the edges of the casing to an extended or operative position indicated in Figure 3.

Connected with the stems at the junction therewith of the arms or with eyes 16 preferably provided at said junction, are the terminals of a draft yoke 17 of hair pin form having at the looped end an eye 18 for the attachment of the fishing line 19. The walls 20 of the cavity formed in the body portion of the device for the reception of the hooks and draft loop bear frictionally against the arms of the latter to afford a resistance to the longitudinal movement of the draft loop, so that the bait may be trolled or manipulated by means of the line without causing the extension of the hooks, but as soon as a strain is applied to the line by resistance afforded by the strike of a fish on the body portion of the bait, the strain on the line causes the projection of the hooks and therefore the engagement thereof with the fish.

Having described the invention, what is claimed as new and useful is:—

An artificial bait having a hollow body portion, hooks pivotally mounted for swinging movement in said body portion for extension laterally therefrom, and a draft loop operatively connected with the hooks and having terminal means for the attachment of the line, the hook extending movement of the draft loop being frictionally retarded by engagement of the side walls of the cavity with the arms of said loop.

In testimony whereof he affixes his signature.

MURRY M. MEIGHEN.